(12) United States Patent
Parry et al.

(10) Patent No.: US 11,500,238 B2
(45) Date of Patent: Nov. 15, 2022

(54) METHODS OF MANUFACTURING POLYMER DISPERSED LIQUID CRYSTAL FILMS

(71) Applicant: Oxford University Innovation Limited, Oxford (GB)

(72) Inventors: Ellis Parry, Oxford (GB); Stephen Morris, Oxford (GB); Steve Elston, Oxford (GB); Alfonso Castrejón-Pita, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 17/296,285

(22) PCT Filed: Nov. 26, 2019

(86) PCT No.: PCT/GB2019/053323
§ 371 (c)(1),
(2) Date: May 24, 2021

(87) PCT Pub. No.: WO2020/109763
PCT Pub. Date: Jun. 4, 2020

(65) Prior Publication Data
US 2022/0011609 A1 Jan. 13, 2022

(30) Foreign Application Priority Data
Nov. 30, 2018 (GB) .................................. 1819634

(51) Int. Cl.
*G02F 1/1334* (2006.01)
*G02F 1/1341* (2006.01)

(52) U.S. Cl.
CPC ........ *G02F 1/1334* (2013.01); *G02F 1/13415* (2021.01)

(58) Field of Classification Search
None
See application file for complete search history.

(56) References Cited

U.S. PATENT DOCUMENTS 6,104,448 A * 8/2000 Doane .................... C09K 19/02
349/12
2004/0189893 A1 9/2004 Choi et al.
(Continued)

FOREIGN PATENT DOCUMENTS

| CN | 101373286 A | 2/2009 |
| JP | H11 142862 A | 5/1999 |
| JP | 2000 122042 A | 4/2000 |

OTHER PUBLICATIONS

International Search Report and Written Opinion for WO 2020/109763 (PCT/GB2019/053323), dated Feb. 24, 2020, pp. 1-7.
(Continued)

*Primary Examiner* — Richard H Kim
(74) *Attorney, Agent, or Firm* — Thomas|Horstemeyer, LLP

(57) ABSTRACT

A method of manufacturing a polymer dispersed liquid crystal, PDLC, film, the method comprising: forming a region of liquid polymer (206) on a substrate (212); depositing one or more liquid crystal, LC, formulations (214) into the liquid polymer; and thereafter curing (234) the liquid polymer (206) to thereby induce phase separation between the polymer (206) and the liquid crystal formulations (214), resulting in PDLC pixels (236) which are phase separated from the surrounding, cured polymer—thereby producing a PDLC film.

15 Claims, 10 Drawing Sheets

(56) References Cited

U.S. PATENT DOCUMENTS

| | | | |
|---|---|---|---|
| 2006/0262266 A1* | 11/2006 | Vogels | G02F 1/133377 349/156 |
| 2013/0293811 A1 | 11/2013 | Bastiaansen et al. | |
| 2014/0141682 A1* | 5/2014 | Kim | B41J 2/17513 445/24 |
| 2015/0198832 A1* | 7/2015 | Yang | G02F 1/13338 349/12 |
| 2016/0085095 A1* | 3/2016 | Chien | C09K 19/0275 349/33 |
| 2018/0143507 A1* | 5/2018 | Campbell | G02F 1/13473 |
| 2021/0208450 A1* | 7/2021 | Wu | G02F 1/1323 |
| 2021/0247636 A1* | 8/2021 | Xiao | G02F 1/13737 |
| 2021/0366410 A1* | 11/2021 | Cho | G02F 1/133615 |

OTHER PUBLICATIONS

UK Search Report for GB 1819634.5, dated Jun. 7, 2019, pp. 1-5.
Parry Ellis et al: "Formation of radial aligned and uniform nematic liquid crystal droplets via drop-on-demand inkjet printing into a partially-wet polymer layer", Optical Materials, Elsevier Science Publishers B.V. Amsterdam, NL, vol. 80, Apr. 25, 2018 (Apr. 25, 2018), pp. 71-76.

* cited by examiner

METHODS OF MANUFACTURING POLYMER DISPERSED LIQUID CRYSTAL FILMS

CROSS-REFERENCE TO RELATED APPLICATIONS

This application is the National Stage of International Application No. PCT/GB2019/053323, filed Nov. 26, 2019, which claims priority to GB 1819634.5, filed Nov. 30, 2018, which are entirely incorporated herein by reference.

FIELD OF THE INVENTION

The present invention relates to polymer dispersed liquid crystals (PDLCs) and more specifically to PDLC films and droplets, and methods of manufacturing same.

BACKGROUND

Polymer dispersed liquid crystals are an important class of optical material that have found wide-ranging industrial application in devices such as smart windows, light shutters, holographic gratings and light valves. A PDLC film consists of droplets of liquid crystal (LC) that are suspended in a polymer matrix. Many of the electro-optical properties of a PDLC film are determined by the alignment of the LC molecules within the droplets. Typically, the independent LC droplets lack any preferential macroscopic orientation between LC domains within the droplet. However, the orientation of the LC molecules can be switched under the application of an external electric field. By matching the refractive index of the polymer matrix to one of the refractive indices of the LC, a scattering or transparent state can be obtained by reorienting the LC domains under an applied electric field.

In a known method for producing PDLC films, a homogenous mixture of LC and polymer is initially formed and then phase-separated either via thermal or photo-polymerization processes. Photopolymerization-induced phase separation has gained interest as it can be triggered upon irradiation of ultraviolet light, allowing for some control over the LC droplet size, orientation and shape. One of the many benefits of PDLCs is their suitability for large-scale manufacturing of large-area films. After the formation of a homogenous mixture of LC and polymer, a glass cell can be filled with the mixture or it can be deposited as a thin film (e.g. by bar-coating or roll-to-roll processes) and photopolymerized. Once cured, the film is fully encapsulated and ready to use.

A drawback with known processes for producing PDLC films is the inherent homogeneity that results from the mixing and coating process. This results in films consisting of a single, homogenous LC and polymer formulation. Because of the inherent homogeneity, typical PDLC smart window panels (e.g. panels of 30-120 cm in width/height), are switched from a transparent to an opaque state across the entire window pane and the sub-division or patterning of the transmission state and/or colour of the panel is not readily possible.

Accordingly, it is an object of the invention to provide alternative manufacturing processes for producing PDLC films which allow for greater control over the distribution of the LC within the polymer layer.

SUMMARY OF THE INVENTION

According to a first aspect of the invention there is provided a method of manufacturing a polymer dispersed liquid crystal, PDLC, film, the method comprising:

forming a region of liquid polymer on a substrate;
depositing one or more liquid crystal, LC, formulations into the liquid polymer; and
thereafter curing the liquid polymer to thereby induce phase separation between the polymer and the liquid crystal formulations.

According to the first aspect, the liquid polymer region, which may be layer or a droplet, is first deposited onto a substrate and then subsequently, one or more liquid crystal, LC, formulations are deposited into the liquid polymer region (e.g. so that the LC formulations are encapsulated by, or dissolved into, the liquid polymer region). This means that it is possible to produce a non-homogenous distribution of LC within the liquid polymer region. This enables a patterned PDLC film to be produced, as well as a PDLC film having PDLC regions made using different liquid crystal formulations. This allows for designs, motifs and additional information such as company logos or advertisements to be imprinted on the film which will be apparent when used in applications such as smart windows.

Curing and phase separation may be performed at least partially by photo-polymerization, or substantially entirely by photo-polymerization.

Curing and phase separation may be performed at least partially by thermal curing, or substantially entirely by thermal curing.

Photo-polymerization may be performed using an ultraviolet, UV, light source having an intensity in the range 10 mW/m² to 200 mw/m² at the surface of the liquid polymer.

Photo-polymerization may be performed for a duration in the range 1 minute to 10 minutes, preferably 4 minutes.

A time delay between depositing a liquid crystal formulation and performing photo-polymerization may be in the range 1 s to 60 s, preferably 5 s to 15 s.

Depositing one or more liquid crystal formulations may comprise inkjet printing liquid crystal droplets from a print head into the liquid polymer.

The inkjet printing process may be a drop-on-demand inkjet process, continuous inkjet printing process or other droplet-based inkjet process such as an electrohydrodynamic jet, e-jet, printing process.

The inkjet printing process may be performed using a print head having a nozzle diameter in the range 50 μm to 180 μm, preferably 120 μm.

The temperature of the print head may be held in the range 20° C. to 80° C., preferably 65° C., during depositing the one or more liquid crystal formulations. Optionally, the temperature of the print head is raised to a level such that the liquid crystal is printed when in the isotropic liquid phase.

An actuation voltage applied to the print head may be in the range 40V to 100V, preferably 80V.

The temperature of the substrate may be held in the range 20° C. to 80° C., preferably 65° C.

The region of liquid polymer may be a layer and may have a thickness in the range 40 μm to 100 μm, preferably 70 μm.

The liquid polymer may comprise or consist of a thiolene-based optical adhesive.

The refractive index of the liquid polymer may be in the range 1.50 to 1.54, preferably 1.52. The liquid crystal formulations may comprise nematic liquid crystals having an ordinary refractive index in the range 1.50 to 1.54, preferably 1.52, and an extraordinary refractive index in the range 1.78 to 1.82, preferably 1.80. In general, the refractive index of the liquid polymer may be selected to match a refractive index of the liquid crystal, e.g. either the ordinary or extraordinary refractive index of the liquid crystal, for a wavelength range over which the PDLC film is intended to be operated, e.g. visible light in the range of approximately 400 nm to 700 nm or a sub-band thereof.

A deposition velocity of the one or more liquid crystal formulations may be in the range 0.5 ms$^{-1}$ to 2.0 ms$^{-1}$ immediately before impact with the region of liquid polymer.

The method may further comprise monitoring the formation and deposition of the liquid crystal formulations using a video camera, for instance in a shadowgraphy configuration.

The method may further comprise performing thermal curing after photo-polymerization.

Thermal curing may be performed for a duration in the range 1 hour to 10 hours at a temperature in the range 60° C. to 80° C., preferably for 4 hours at a temperature of 70° C.

The method may further comprise applying an external electric field to the substrate during the step of photo-polymerization.

The method may further comprise positioning a top substrate over the polymer after the step of curing.

The method may further comprise, after the step of curing, coating the region of polymer with a conductive polymer and, optionally, affixing electrodes to the conductive polymer. The conductive polymer may be inkjet printed and may be a layer.

The region of liquid polymer may be deposited by a thin-film deposition technique or inkjet printing process.

The LC formulations may comprise one or more of the following: nematic liquid crystals; and/or chiral nematic liquid crystals; and/or smectic liquid crystals; and/or blue phase liquid crystals; and/or reactive mesogens.

The LC formulations may further comprise one or more of the following: colour dyes; and/or additional particles to increase light scattering properties; and/or ionic dopants; and/or surfactants to improve printability of the LC formulations.

The nematic liquid crystal may have either a positive or negative dielectric anisotropy.

Either in-plane or transverse electric fields can be used to switch a PDLC film transmission state.

According to a second aspect, there is provided a method of manufacturing a polymer dispersed liquid crystal, PDLC, film, the method comprising:
 inkjet printing a mixture comprising a liquid polymer and liquid crystal formulations onto a substrate; and
 thereafter curing the liquid polymer to thereby induce phase separation between the polymer and the liquid crystal formulations.

The mixture may be inkjet-printed to form a substantially even layer on the substrate.

The mixture may be printed at discrete locations on the substrate to form localized sessile droplets.

The step of curing may form PDLC droplets with micron-sized domains.

The step of curing may form PDLC droplets with nano-sized domains.

The step may form encapsulated LC droplets.

According to a third aspect, there is provided a polymer dispersed liquid crystal, PDLC, film, manufactured using the method of the first aspect (including any of the optional features disclosed above).

DETAILED DESCRIPTION

The invention is described in further detail below by way of example and with reference to the accompanying drawings, in which.

Figure 1A:
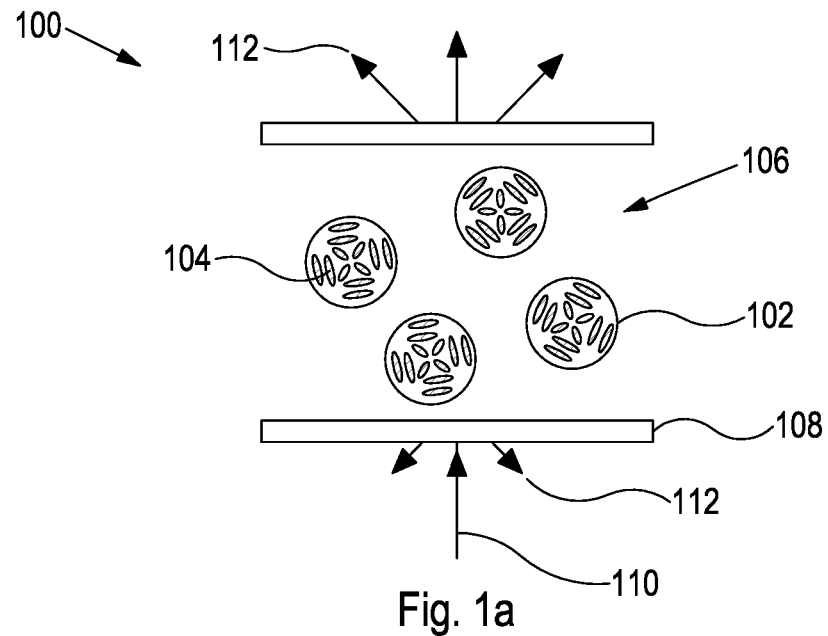
FIGS. 1a and 1b illustrate schematically the light scattering properties of a PDLC film in a voltage off and on state, respectively.
Figure 1B:
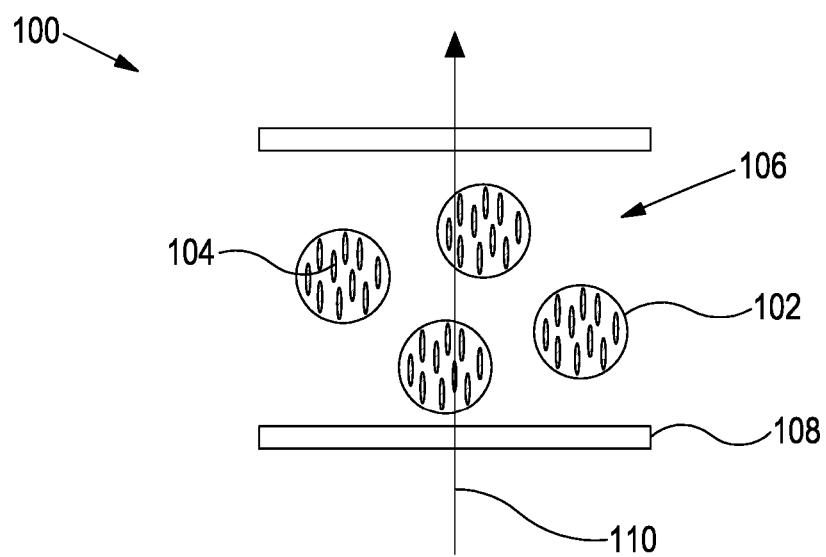

FIGS. 1a and 1b illustrate the light scattering properties of a PDLC film 100 in an off and on state respectively. Liquid crystals 104 are formed in droplets 102 held within a polymer matrix 106 which is itself contained between outer surfaces 108. Liquid crystals 104 are birefringent with a refractive index that is dependent on the orientation of the liquid crystal molecules. Under an applied electric field, the liquid crystal molecules 104 re-orient. In order for the film 100 to switch between transparent and opaque states, the refractive index of the polymer binder 106 is matched to one refractive index of the liquid crystal 104 in a particular orientation. In FIG. 1a no external electric field is applied to the film 100, i.e. it is in an off state. In the off state the orientation of the liquid crystal 104 within droplets 102 is random meaning that there is a refractive index mismatch between the liquid crystal 104 and the surrounding polymer binder 106. This refractive index mismatch results in scattering of the incident light 110 to produce scattered light 112 both at the front and rear surfaces of the PDLC film 100. If the amount of scattering is sufficient then the PDLC film 100 can appear opaque in the off state. FIG. 1b shows the PDLC film 100 under an applied electric field, i.e. in the on state. In this state the liquid crystals 104 orient themselves with the applied electric field such that the there is no refractive index mismatch between the liquid crystals 104 and the surrounding polymer binder 106. This means that the incident light 110 is not refracted/scattered and the PDLC film 100 appears transparent. In addition to, or instead of, switching under an applied external electric field, as discussed above, a PDLC film may also be switched optically (e.g. by incident sunlight) using materials that undergo photoisomerization resulting in a change in the refractive index properties.

Figure 2:
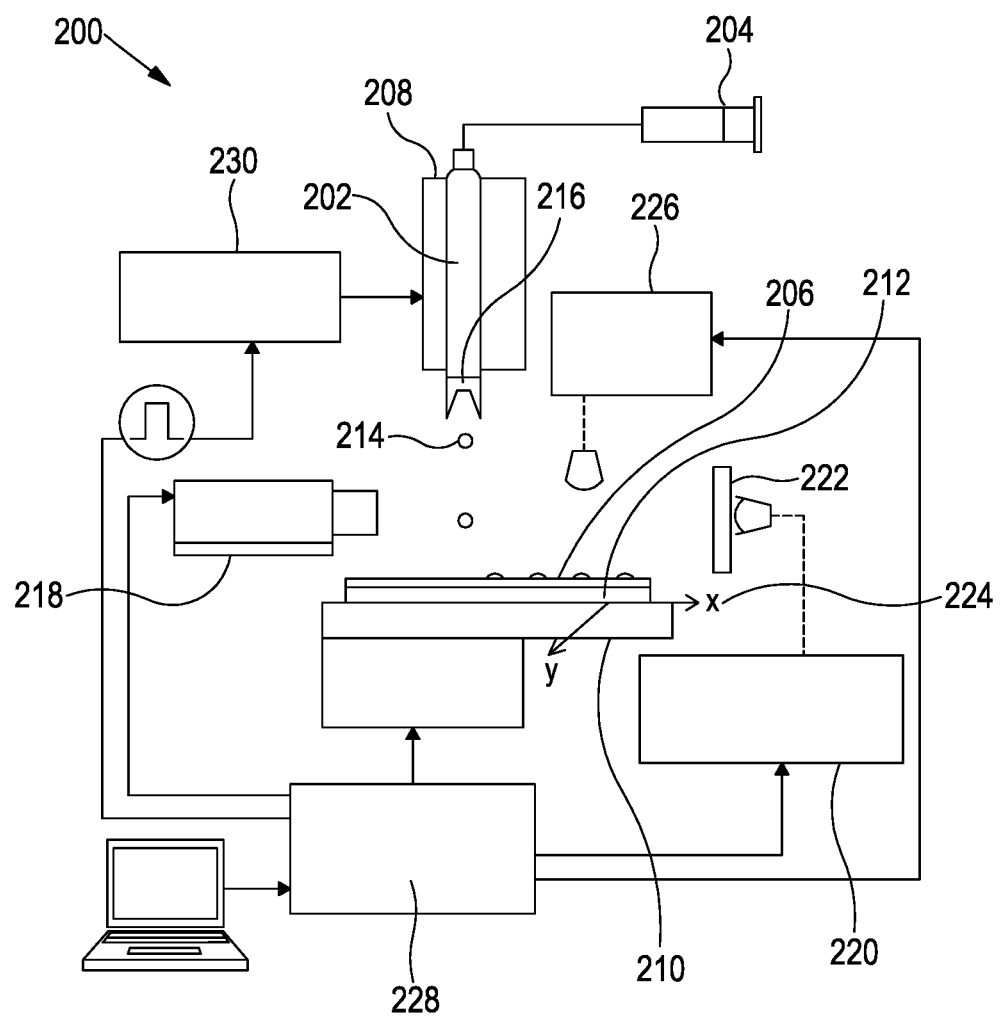
FIG. 2 illustrates schematically an apparatus used to manufacture PDLC films by inkjet printing.

Drop-on-demand (DoD) inkjet printing is a fabrication process that allows for small droplets of a fluid to be deposited at well-defined, localized, locations on a substrate. The inventors have appreciated that DoD inkjet printing (or alternatively also a continuous inkjet printing process or other droplet-based inkjet process) is a suitable platform for the manufacture of PDLC films. FIG. 2 illustrates schematically an apparatus 200 used to manufacture PDLC films by DoD inkjet printing according to the present invention. A print head 202 deposits LC droplets onto a region of a liquid, UV-curable polymer 206. The region may be a substantially uniform layer or a droplet of UV-curable polymer. A syringe pump 204 is used to supply the LC to the print head 202. A first heating unit 208 is used to heat the print head 202 and a second heating unit 210 is used to heat a substrate 212 on which the layer of polymer 206 is situated. LC droplets 214 are formed at the nozzle 216 of the print head 202, from where they are emitted and impact with the polymer 206. Accurate positioning of the droplet may be achieved using an x-y motorized stage 224 arranged to move the substrate/polymer layer relative to the print head 202. An ultraviolet light source 226 is used to photo-cure the polymer 206 containing the deposited LC droplets 214. In this manner phase separation between the polymer 206 and LC droplets 214 is induced by photo-polymerization.

Figure 3A:
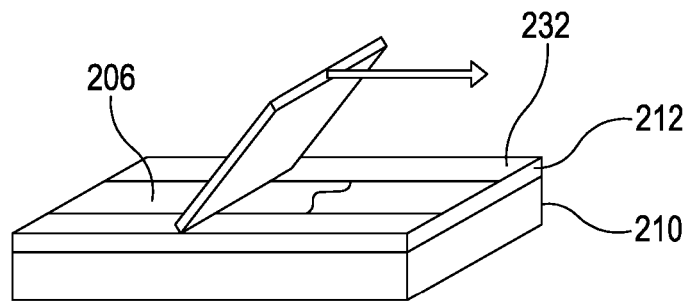
FIGS. 3a to 3c illustrate three example process steps for forming a PDLC film.
Figure 3B:
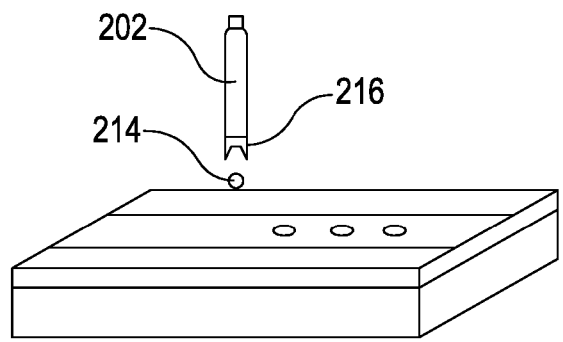
Figure 3C:
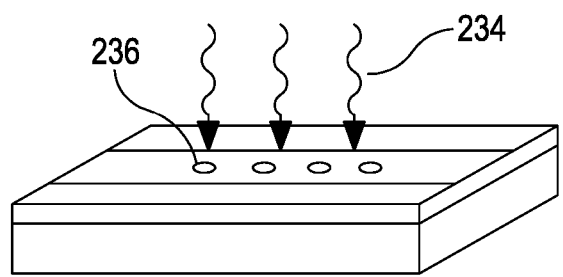

Three process steps for forming a PDLC film according to an embodiment of the invention are illustrated in FIGS. 3a to 3c. In FIG. 3a, the uncured polymer 206 is drop casted onto a channel formed on the substrate 212, e.g. with walls 232 at the edges of the substrate to contain the liquid polymer 206. In FIG. 3b, the LC droplets 214 are printed onto the uncured liquid polymer 206 in the manner described above. In FIG. 3c, UV radiation 234 is applied to perform photo-curing of the sample resulting in PDLC pixels 236 which are phase separated from the surrounding, cured polymer—thereby producing a PDLC film.

In one example, the print head 202 used was a MJ-ABP-01-120 dispenser (Microfab Technologies Inc.) with a 120 μm nozzle diameter. The nematic LC chosen was the commercial nematic mixture, BL006 (Merck KGaA), which was supplied to the dispenser/print head 202 via a static pressure syringe pump 204. The highly birefringent LC BL006 has a clearing temperature of around 110° C., with an ordinary refractive index of approximately $n_o$=1.52 and an extraordinary refractive index of approximately $n_e$=1.80 at a wavelength of 633 nm and a temperature of 20° C. The thiolene-based optical adhesive NOA65 (Norland Products inc.), which involves a step-growth polymerization process, was selected as the UV-curable polymer binder 206. This nematic LC and UV-curable polymer combination was chosen because the ordinary refractive index ($n_o$) of BL006 is roughly matched to the refractive index of the polymer binder ($n_p$)~1.52. However, it should be appreciated that other LCs and UV-curable and thermal-curable polymers may be selected without departing from the invention. Two heating units 208 and 210 with 20 W heating elements (DBK-HPOS, DBK Enclosures) and K-type thermocouples were used to control both the print-head 202 and printing substrate 212 temperatures to within 1° C. of accuracy.

According to this example, drop 214 formation at the nozzle 216 as well as the subsequent impact onto the substrate was captured using a combination of a high-speed camera 218 (Phantom V12.1) and a halogen high-intensity white light source 220 (OSL2 3200K, Thorlabs), which was directed through a UV filter 222 and arranged in a shadowgraphy configuration. These components were used to assess the performance of the droplet printing but it should be appreciated that they are not essential to the invention. Accurate positioning of the droplet was achieved using an x-y motorized stage 224 that could be translated in 50 μm increments. The samples were photo-cured using a high-powered UV LED 226 (Thorlabs, CS2010 UV high power UV curing LED system) held at a fixed distance of 50 mm above the sample. The UV curing duration, power, temperature and time delay after printing were altered to investigate the effects on the resulting PDLC film. Timing synchronization, temperature control and droplet positioning, speed and volume were controlled using a purpose-built LabVIEW program in combination with a computer-controlled DAQ card 228 (NI USB-6351, National Instruments).

To deposit the LC, the temperature of the print head was maintained at 65° C., since at this temperature the viscosity of the LC was sufficiently reduced to deposit via printing. However, other print head temperatures may also be suitable. A square-wave voltage pulse of 55V was supplied to the print head by an amplifier 230 in order to generate a single well-defined LC droplet (via push-mode, DoD) without the formation of satellite droplets. At this voltage, the resulting droplet velocity, which was determined from the analysis of the high-speed images, was found to be 0.9±0.1 $ms^{-1}$. The diameter of the droplets produced was slightly less than the nozzle diameter, ranging between 100-110 μm. The substrate 212 was prepared by first applying a spacer to the microscope slides to form 70 μm-thick 'walls' (using one or two layers) at the edges of the substrates. However, it should be appreciated that depending on the application the walls may have different heights/thicknesses or may not be required at all. The uncured polymer binder was then drop casted onto the channel that had been formed and coated using doctor blading to form a film of even thickness. The temperature of the substrate was controlled to within 20-70° C. using heater 210.

Figure 4:
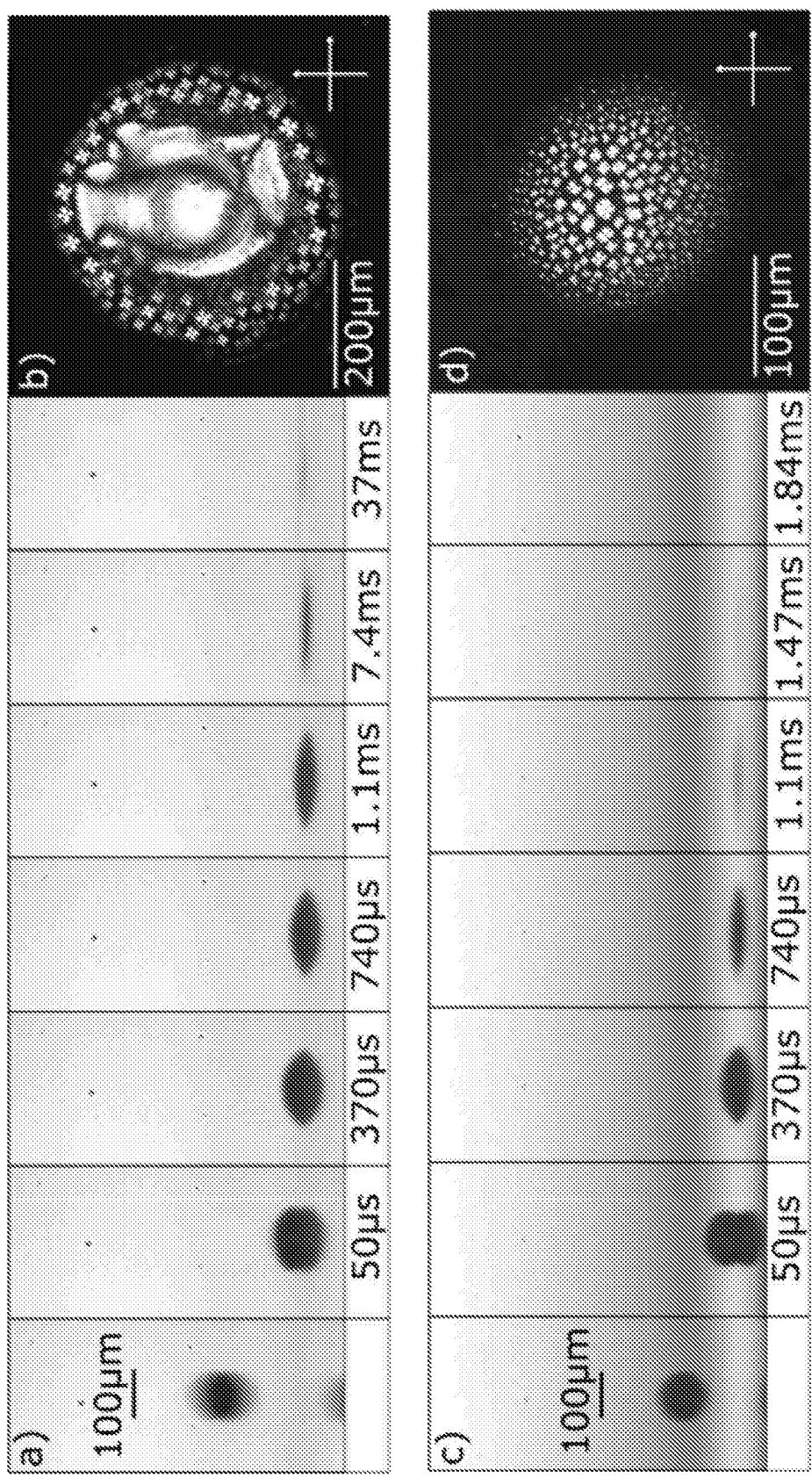
FIG. 4 shows high-speed images of an LC droplet impacting a polymer binder, and associated polarized microscopy images after curing.

A consideration for forming a PDLC film using a photopolymerization-induced phase separation process is the adequate mixing of the LC and polymer binder. With the method presented herein, this is at least partially achieved during the impact between the LC droplet and the photocurable polymer. FIG. 4 shows high-speed images of a droplet of the nematic LC, BL006, impacting the polymer binder, NOA65, according to one example. In FIG. 4, panel a) Shows an LC droplet printed at 65° C. impacting the 70 μm-thick photo-curable polymer layer that was held at a temperature of 22° C. by means of the substrate heater described above. As seen in the sequence of high-speed images, the LC droplet is still visible after 37 ms, suggesting that the LC had not fully dissolved into the polymer. The sample was left for 10 s before phase-separation took place in-situ, triggered by irradiating the sample with UV light for 4 minutes at an intensity of 75 $mW/m^2$ to effect photopolymerization. Panel b) of FIG. 4 shows the subsequent polarized microscopy image of the photocured polymer-LC sample captured after deposition and the photopolymerization process. The image shows that the LC did not fully dissolve into the polymer binder nor did extensive phase separation occur during the photopolymerization process. The centre of the image in panel b) of FIG. 4 shows a pure LC region with a horizontal width of 220 μm. The area of this domain is comparatively large with respect to the printed droplet and in addition to the high-speed images, indicates that a portion of the LC may have spread on top of the polymer film without dissolving fully into the polymer binder prior to photopolymerization. This was confirmed experimentally, since upon gentle agitation of this central region with a cotton bud, the LC domain was easily disturbed, i.e. it is situated at the surface. The presence of small PDLC droplets, particularly around the fringes of the main body of the droplet, indicates that a degree of mixing and photo-induced phase separation has occurred. After the polarized microscopy images were taken, the sample was thermally cured for 4 hours at 70° C. and then re-examined using polarized microscopy. There was no identifiable difference between the images taken before and after thermal curing, indicating the sample had undergone near complete photopolymerization without necessarily requiring any further curing, e.g. by thermal means. Therefore, it should be appreciated that subsequent thermal curing of the sample is not essential to the formation of PDLC films according to the invention. However, a post UV or thermal process may be beneficial to ensure that the polymer is fully cross-linked.

To examine whether an increase in the droplet velocity could encourage further mixing, the actuation voltage of the print head was increased to 80V, resulting in a droplet velocity of 1.6 ms$^{-1}$±0.1 ms$^{-1}$. However, the increased velocity did not appear to yield any observable improvements to the miscibility of the LC and polymer when the photo-curable layer was held at a temperature of 22° C. To encourage further initial mixing on impact of the LC droplet with the uncured polymer binder layer, the temperature of the substrate 212 was increased further by means of the heater 210. Panel c) of FIG. 4 shows the impact between a LC droplet, printed at 65° C., with a photo-curable polymer layer held at 55° C. It is evident that the LC dispersed much more readily with the polymer under these conditions and after 1.84 ms the LC droplet is clearly indiscernible from the polymer layer in the high-speed images. After a delay of 10 s, the sample was then photo-cured using identical UV conditions to the sample presented in panel a) of FIG. 4. The polarized microcopy image of the resulting droplet is shown in panel d) of FIG. 4 and confirms the increased miscibility between the LC and polymer phase. After phase separation, it can be seen that a high-density region of PDLC droplets exists that occupy a circular region, or 'pixel', of approximately 170 µm in diameter. It is evident that the LC droplets within this region are polydisperse, with diameters ranging from approximately 1 to 8 µm. The full encapsulation of the LC domains was confirmed by agitating the polymer surface with no change in the LC droplets observed. However, despite the formation of PDLC 'pixels', the size of the LC droplets in the region are still typically too large, and the density of the domains too low, to efficiently scatter visible light.

Figure 5:
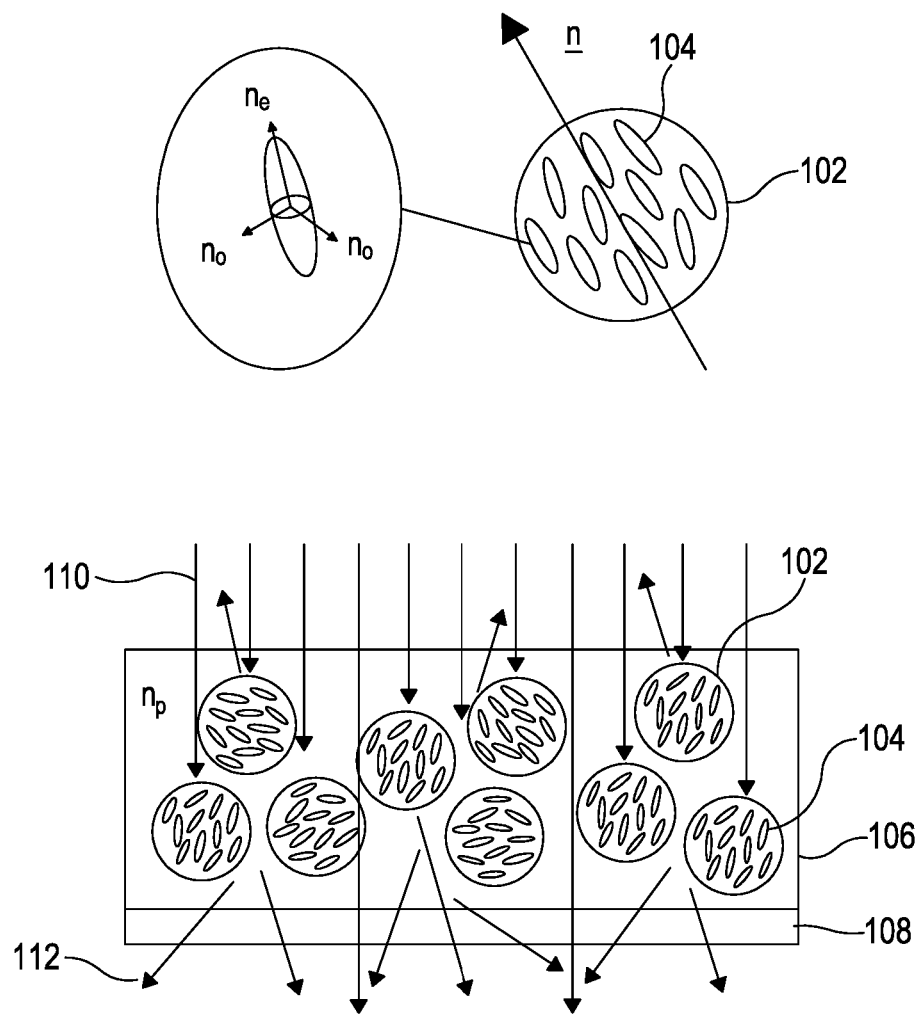
FIG. 5 shows a schematic of a PDLC film consisting of bipolar LC droplets.

Due to the nature of the photopolymerization process, the macroscopic director within the nematic LC droplets is randomly oriented, with no correlation of the macroscopic preferential orientation across different LC domains. As only one component of the refractive index of the nematic LC, $n_o$, is matched to the refractive index of the polymer, $n_p$, incident light experiences a refractive index mismatch on propagating through the LC droplets and polymer binder. This process is illustrated in FIG. 5 and results in the scattering of light as it passes through the film, where the same reference numerals as FIGS. 1a and 1b have been adopted for like features. For optimum light scattering, the LC domain size should preferably be slightly larger than the wavelength of the incident light. For visible light scattering applications, this corresponds to a droplet size distribution between 0.5 to 1.5 µm in diameter. The size of the LC domains in a PDLC film are primarily determined by the UV curing intensity, duration of exposure to UV light, curing temperature, nematic LC concentration, and the physical properties of the LC and polymer phases such as the elastic coefficients, interfacial tension and viscosity. In addition, according to the present invention the delay between the deposition of the droplet and photo-polymerization process is a further parameter which influences the size of the LC domains. In general, increasing the UV curing intensity and/or curing temperature increases the rate at which polymerization occurs, resulting in smaller LC domains.

Figure 6:
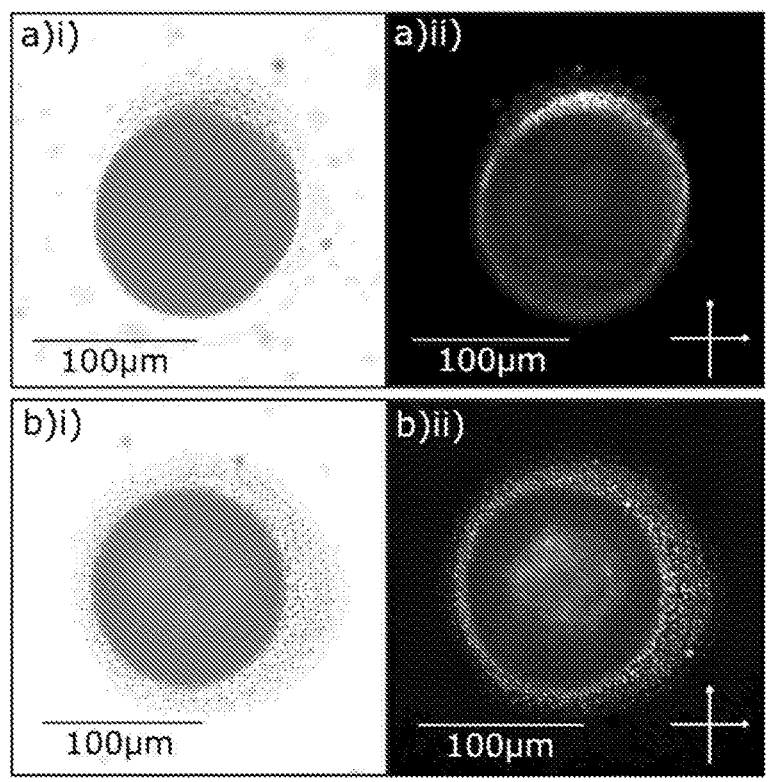
FIG. 6 shows optical and polarized microscope images of a single nematic LC droplet printed onto a liquid polymer layer and subsequently cured.

To obtain smaller LC domains, the substrate temperature was increased further to a temperature of 65° C. and the UV light intensity was reduced from 75 mW/m$^2$ to 40 mW/m$^2$. In FIG. 6, panels a)i) and a)ii) show the resulting microscopy and polarized microscopy images of a printed PDLC element, which was formed by printing the nematic LC, BL006, onto a 70 µm-thick wet polymer substrate (NOA65) and photo-cured when the sample was held at the higher temperature of 65° C. with a UV light intensity of 40 mW/m$^2$ for 4 minutes. The initial delay between printing and curing was 1 second. As can be seen in the microscopy image, there is a darker central area that is approximately 120 µm in diameter, indicating that the domain is highly light scattering. There is a thin region around the perimeter of the droplet which has a lower density of LC domains, which is particularly visible in the polarized microscopy image in panel a)ii) of FIG. 6. By inspection of the microscopy image, it can be seen that the higher photo-curing intensity and temperature resulted in LC domains that were between 0.5 to 1 µm in diameter and the resulting PDLC 'pixel' has improved light scattering properties. An approximation of the volume fraction of LC to photopolymer of the PDLC pixel can be estimated by comparing the volume of the printed LC droplet to that of a cylinder with a diameter equal to that of the high-density regime and a height equal to that of the photo-polymer (NOA65) layer. For a droplet diameter of 100 µm, this gives a volume fraction of 66% LC to photopolymer, which is consistent with typical fractions used for PDLC light-scattering applications.

To examine the effect of the delay time between droplet deposition and commencing photopolymerization, a sample was prepared under identical conditions to that presented in FIG. 6 panels a)i) and a)ii), but with a delay time of 40 s between deposition and commencement of photopolymerization. Panels b)i) and 6 b)ii) in FIG. 6 show the resulting microscopy and polarized microscopy images for the longer delay time process. The low-density regime of the LC droplets around the perimeter of the pixel is larger than that observed for the sample photo-cured 1 s after printing, which is particularly evident from the image in FIG. 6 panel b)ii). Nevertheless, the area of the high-density central regime is of a comparable size to that of the previous sample, with a diameter of 120 µm. The results suggest that the majority of the LC is effectively pinned to an area close to that of the maximum area of the droplet as it initially spreads on top of the photopolymer (NOA65) layer during droplet impact. It is suspected that the mobility of the LC molecules is hindered due to the large, high molecular weight polymer chains of the photopolymer. In addition, although the increased substrate temperature should increase the mobility of the LC molecules, it may in fact also initiate partial cross-linking of the photopolymer, thereby further impeding the mobility of the LC molecules.

Figure 7:
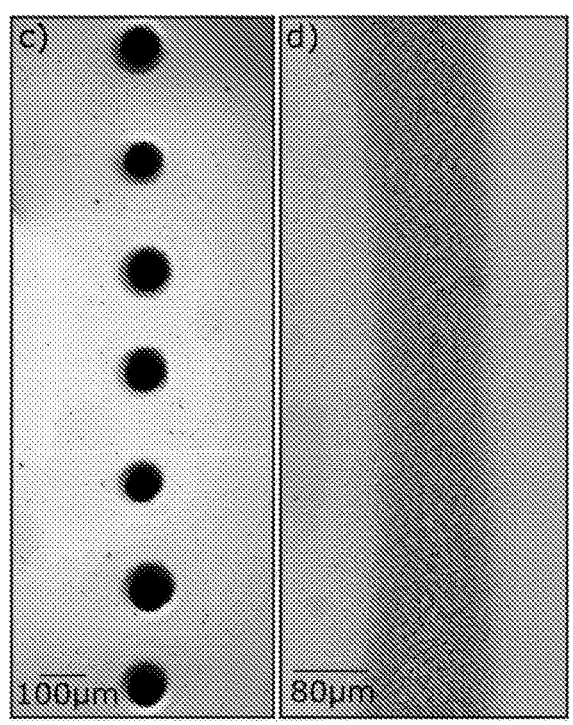
FIG. 7 shows microscopy images of a single line array of printed PDLC pixels and a printed PDLC line.

In addition to the formation of individual PDLC pixels, inkjet printing makes it possible to form arrays of pixels as shown in FIG. 7 panel c). The line array was printed with the wet photopolymer layer held at a temperature of 65° C., e.g. by substrate heater 210. After a 10 s delay, the sample was then cured at 65° C. using a UV-light source with a power density of 185 mW/m$^2$ at the exit of the source, which was held at a distance of 2 cm from the sample. The printed line seen in FIG. 7 panel d) was deposited by supplying the print head with a step-input voltage pulse. This results in an extended fluid ligament, which combined with translation of the printing substrate, results in the ability to print lines.

Additionally, line geometries could also be produced by printing LC droplets close to each other. Tests have been carried out using smaller nozzles printing, with results indicating that feature sizes at least as small as 15 µm could be produced.

Figure 8:
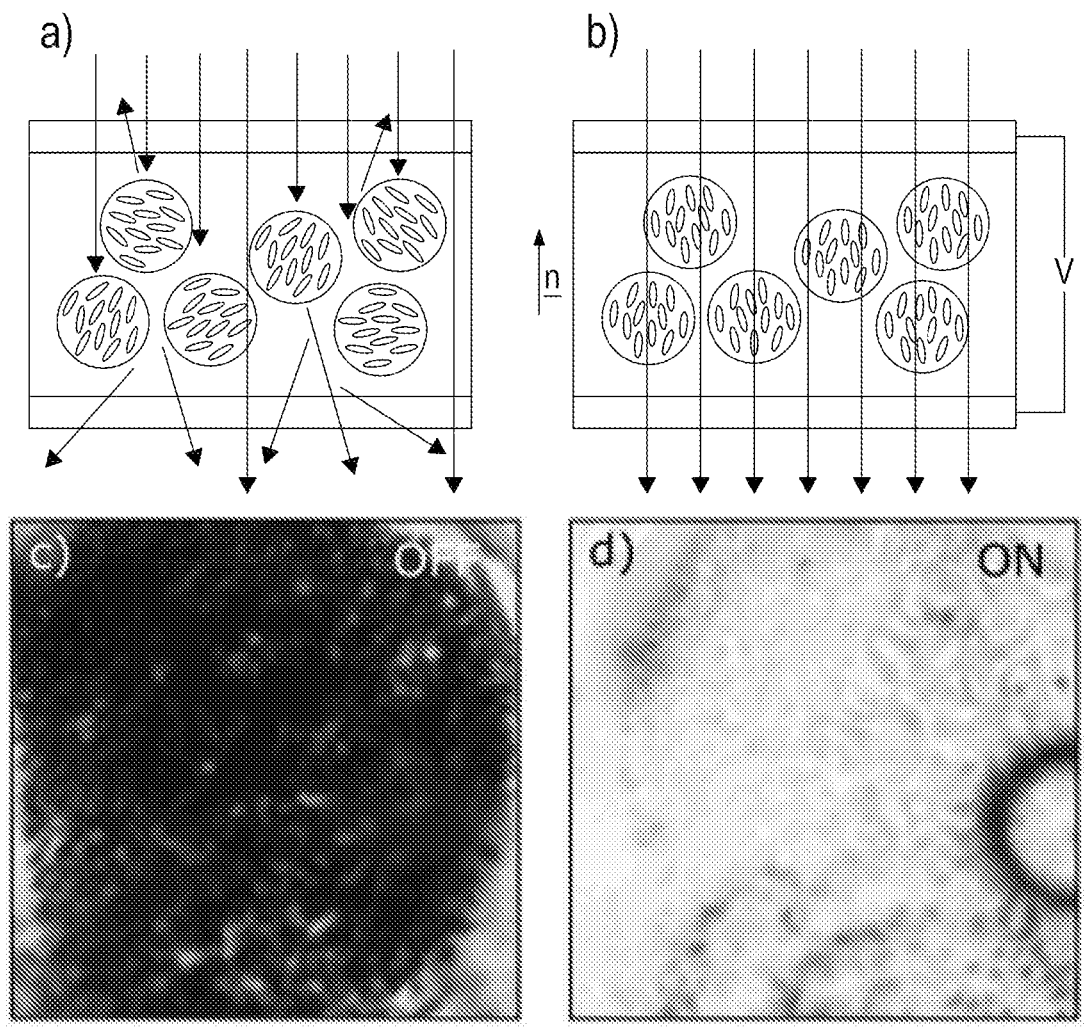
FIG. 8 shows optical microscope images of a printed PDLC pixels in a voltage on state and in a voltage off state.

In order for the PDLC pixels to switch from an OFF, scattering state, shown in FIG. 8 panel a), to an ON, non-scattering state, shown in FIG. 8 panel b), the LC molecules should be able to re-orient under the application of an electric field. When the LC molecules orient parallel to an applied electric field, incident light will experience only the ordinary component of the LC refractive index, $n_o$. Since this is matched to the refractive index of the cured photopolymer, $n_p$, the incident light is then not scattered by the sample as shown in FIG. 8 panel b). To investigate the switching of printed PDLC pixels according to the invention, the films were carefully peeled away from the printing substrate using a scalpel and sandwiched between ITO-coated glass. To ensure a constant cell gap of 70 µm, spacer tape was used around the perimeter of the cell and optical glue was then used to bind the substrates together.

Figure 9:
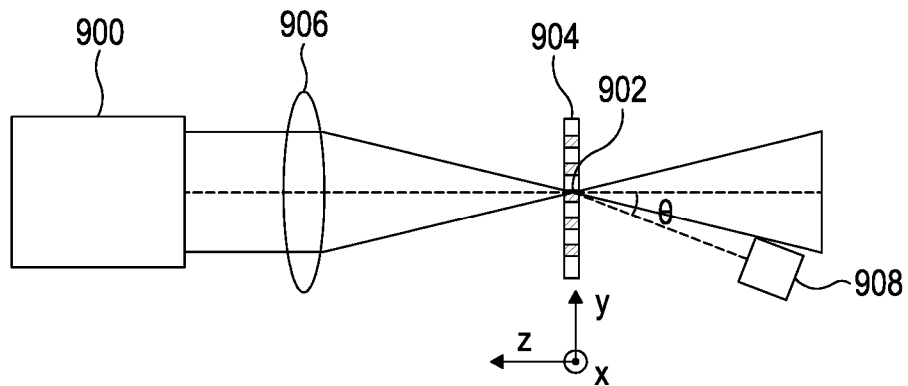
FIG. 9 shows an optical setup used to characterize light scattering properties of a printed PDLC pixel.
Figure 10:
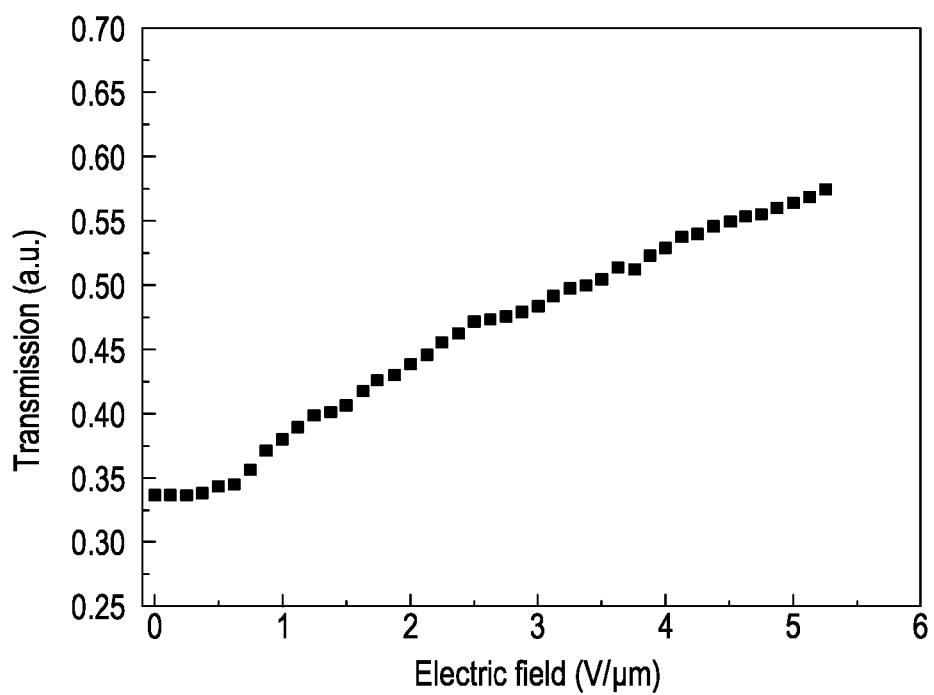
FIG. 10 is an experimental plot showing the effective transmissions of 633 nm laser light through a single printed PDLC pixel as a function of the applied electric field amplitude.

Panels c) and d) in FIG. 8 show optical microscopy images of a single PDLC pixel in the off/dark state and on/transparent state, respectively. With reference to FIG. 9, to characterize quantitatively the change in the light scattering of the printed PDLC pixels with electric field, a He—Ne laser 900 (633 nm, continuous wave) was focused onto an individual PDLC pixel 902 of a PDLC film 904, fabricated according to the present invention, using a focusing lens 906 (f=250 mm). A photo-diode 908 (PDA36A-EC, Thorlabs) was then positioned at an angle of 8° from the laser beam propagation direction so as to measure the forward off-axis scattered light. The intensity of light reaching the photodiode was recorded as the voltage across the PDLC film was increased. FIG. 10 shows the effective transmission of the PDLC pixel as the voltage is increased. As seen, the PDLC pixel effectively changes from a dark to transparent state under application of the external electric field.

Figure 11A:
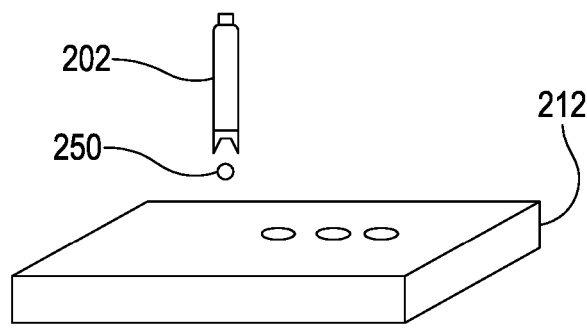
FIGS. 11a to 11c illustrate three example process steps for forming a PDLC film by printing a mixture of liquid polymer and LC.
Figure 11B:
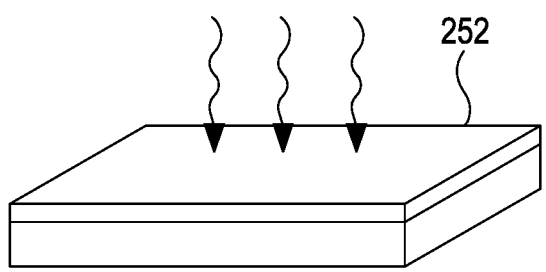
Figure 11C:
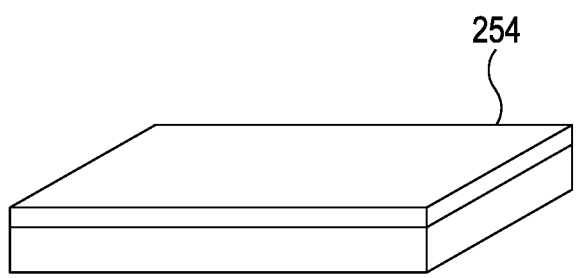

Three process steps for forming a PDLC film according to an embodiment of the invention are illustrated in FIGS. 11a to 11c. According to this embodiment, a premixed formulation 250 composed of an LC formulation and a UV-curable polymer is printed using a print head 202 directly onto a substrate 212, FIG. 11a. The inkjet printing is arranged to directly print a film 252 onto the substrate. This is achieved by arranging the printing substrate and printing conditions so as to encourage full wetting of the printing substrate 212. After deposition of the thin film 252 it is irradiated with UV light in a similar manner as described above, FIG. 11b. The irradiation process induces phase separation between the LC and polymer and results in a PDLC film 254 as shown in FIG. 11c. Thus, according to this embodiment a PDLC film is manufactured by inkjet printing a pre-mixed formulation of LC and UV-curable polymer in one step, rather than first providing a liquid, UV-curable polymer layer and subsequently adding the LC formulations.

Figure 12A:
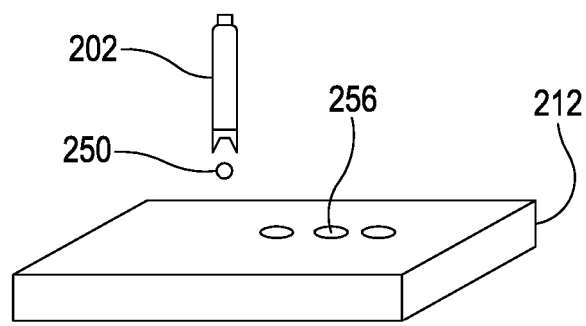
FIG. 12 illustrates three process steps for forming localized PDLC droplets on a substrate.
Figure 12B:
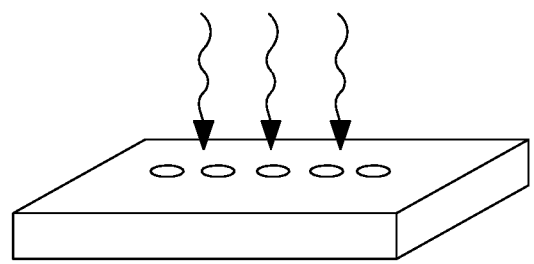
Figure 12C:
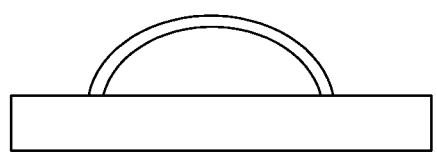
Figure 12D:
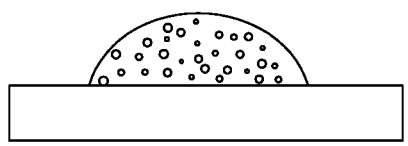
Figure 12E:
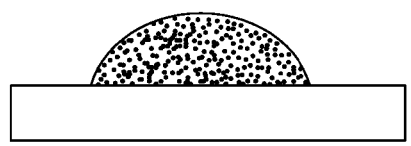

The PDLC film manufactured according to the method described with reference to FIGS. 11a to 11c is essentially homogenous, in that it does not contain discrete PDLC pixels as described previously. However, alternatively the printing substrate and printing conditions can be arranged to encourage the pre-mixed LC formulation and UV-curable polymer to form sessile droplets on the surface of the substrate. This is illustrated in FIGS. 12a to 12c. According to this embodiment, a premixed formulation 250 composed of an LC formulation and a UV-curable polymer is printed using a print head 202 directly onto a substrate 212, FIG. 12a. This results in a number of discrete sessile droplets 256 of LC formulation and UV-curable polymer on the surface on the substrate. After deposition of the sessile droplets they are irradiated with UV light in a similar manner as describe above, FIG. 12b. Depending on the UV curing conditions three possible configurations are achievable which are illustrated in FIGS. 12c, 12d and 12e. Specifically, the UV-curing may result in either an encapsulated LC droplet, FIG. 12c, a PDLC droplet with micron-sized domains, FIG. 12d, or a PDLC droplet with nano-sized domains, FIG. 12d.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of manufacturing a polymer dispersed liquid crystal, PDLC, film, the method comprising:
 forming a region of liquid polymer on a substrate;
 depositing one or more liquid crystal, LC, formulations into the liquid polymer; and
 thereafter curing the liquid polymer to thereby induce phase separation between the polymer and the liquid crystal formulations.

2. The method according to claim 1, wherein curing and phase separation is performed at least partially by photo-polymerization.

3. The method according to claim 2, further comprising performing thermal curing after photo-polymerization and/or applying an external electric field to the substrate during the step of photo-polymerization.

4. The method according to claim 1, wherein curing and phase separation is performed at least partially by thermal curing.

5. The method according to claim 1, wherein the step of depositing one or more liquid crystal formulations comprises inkjet printing liquid crystal droplets from a print head into the liquid polymer.

6. The method according to claim 5, wherein the inkjet printing process is a drop-on-demand inkjet printing process, a continuous inkjet printing process or an electrohydrodynamic jet printing process.

7. The method according to claim 1, wherein the region of liquid polymer is a layer of liquid polymer, or alternatively a droplet of liquid polymer.

8. The method according to claim 1, wherein the liquid polymer is a thiolene-based optical adhesive.

9. The method according to claim 1, wherein a refractive index of the liquid polymer is selected to match a refractive index of the liquid crystal formulations.

10. The method according to claim 1, further comprising the step of monitoring the formation and deposition of the liquid crystal formulations using a video camera, optionally in a shadowgraphy configuration.

11. The method according to claim 1, further comprising positioning a top substrate over the polymer after the step of curing.

12. The method according to claim 1, further comprising, after the step of curing, coating the region of polymer with a conductive polymer and, optionally, affixing electrodes to the conductive polymer.

13. The method according to claim 1, wherein the region of liquid polymer is deposited by a thin-film deposition technique or inkjet printing process.

14. The method according to claim 1, wherein the LC formulations comprise one or more of the following:
nematic liquid crystals;
chiral nematic liquid crystals;
smectic liquid crystals;
blue phase liquid crystals; and/or
reactive mesogens.

15. The method according to claim 1, wherein the LC formulations further comprise one or more of the following:
one or more colour dyes;
additional particles to increase light scattering properties;
ionic dopants; and/or
surfactants to improve printability of the LC formulations.

* * * * *